Figure 1:
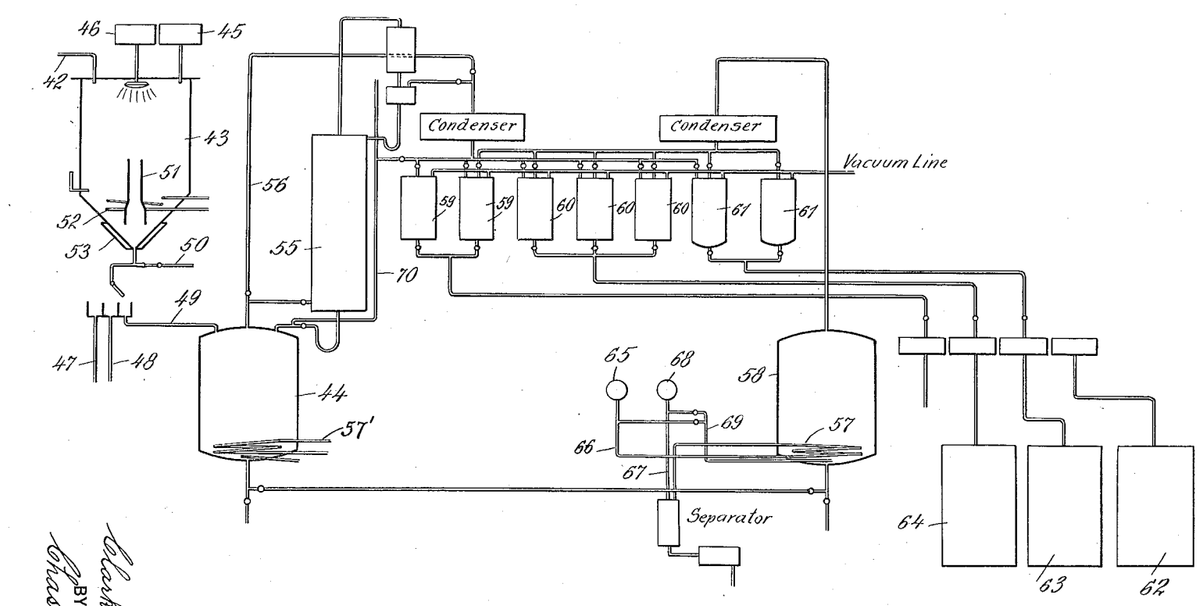

Sept. 18, 1923.

C. M. DENNIS

PRODUCTION OF RESIN

Filed May 5, 1919

1,468,440

2 Sheets-Sheet 1

INVENTOR
Clark M. Dennis
BY
Chas. W. Mortimer
ATTORNEY

Sept. 18, 1923.

C. M. DENNIS
PRODUCTION OF RESIN
Filed May 5, 1919

1,468,440

2 Sheets-Sheet 2

INVENTOR
Clark M. Dennis
BY
Chas. W. Mortimer
ATTORNEY

Patented Sept. 18, 1923.

1,468,440

UNITED STATES PATENT OFFICE.

CLARK M. DENNIS, OF MONTCLAIR, NEW JERSEY, ASSIGNOR TO THE BARRETT COMPANY, A CORPORATION OF NEW JERSEY.

PRODUCTION OF RESIN.

Application filed May 5, 1919. Serial No. 295,017.

*To all whom it may concern:*

Be it known that I, CLARK M. DENNIS, a citizen of the United States, residing at Montclair, in the county of Essex and State of New Jersey, have invented certain new and useful Improvements in the Production of Resin, of which the following is a specification.

My invention relates to improvements in the production of a resin (commonly known as cumaron resin or paracumaron) which consists of one or more of the polymerization products of cumaron, indene, and other polymerizable bodies found in those naphthas and heavy benzols obtained from the distillation of coal tar and from benzol and toluol manufacture, which boil within the approximate range from 135° C. to 230° C. It relates more particularly to improvements which, separately and conjointly, contribute to the production of a resin of improved properties. In particular, it relates to the production of a resin which is clear, light colored, and of high melting point, and which does not absorb water.

It has heretofore been proposed to produce cumaron resin from solvent naphtha or heavy benzol boiling within the approximate range of from 160° to 180° C., by treatment with small amounts of concentrated sulfuric acid, the polymerization process being effected with rise of temperature to about 100° C. or over during the reaction. From the resulting product, after neutralization and setting, the unchanged naphtha and other volatile hydrocarbons such as naphthalene are distilled by heating to about 240° C.

The cumaron resin obtained in accordance with such prior proposals is apt to be of dark color, while still in solution in the unchanged naphtha, and to further darken by the final heating. Moreover, by this procedure, it is generally impossible to obtain from the crudes commonly available the highest melting resin. It is a further disadvantage of such prior methods that the excess soda and sodium sulfate suspended in the neutralized oil are ordinarily removed very slowly and incompletely by settling, and are usually present to an appreciable degree in the finished resin, causing it to be cloudy in appearance and to whiten should it come in contact with water.

In the production of cumaron resin, or resins of the cumaron, indene, etc., series, it is important to produce products of substantially uniform qualities, and of uniformly improved qualities, so that the desired quality of product may be produced at different periods of time from the materials then available. The naphtha or naphtha fractions containing the polymerizable constituents, however, contain constantly varying proportions of the various individual compounds, and vary considerable in their constituents adapted for the resin production. It should be noted also that the resin in question is a product which is not readily subjected to further purification after it has been produced. The process and its problems are thus distinguished from the majority of chemical processes in which the crude materials used are nearly uniform in composition and in which the product produced may be progressively purified.

I have, nevertheless, discovered that it is possible to produce products of substantially uniform, and uniformly high qualities, from naphthas having constantly varying characteristics; and that products of high purity and improved properties can be produced, moreover, from naphthas having a wide boiling point range.

The various improvements which, separately and in combination go to make up the improvements of the present invention may be generally grouped under three steps or groups of steps, certain of which may be independent or inter-dependent, and used independently or conjointly or successively. These three steps or groups of steps relate to, first—the preliminary treatment of the starting materials and the compounding of the charge; second, the polymerization treatment; and third, the subsequent treatment.

The preliminary steps of the process relate to the selection and compounding and preliminary treatment or purification of the solvent naphthas and heavy benzols so that there may be obtained therefrom products of the desired qualities. According to my invention, I make use of naphthas boiling between the approximate limiting temperatures of 135° to 230° C. The various commercial naphthas boiling within this range are derived from several sources, and contain varying amounts of cumaron, indene and other polymerizable materials, depending on their source and boiling point range.

Certain crudes have a high content of cumaron, etc., while other crudes contain less polymerizable material. I have nevertheless found that these varying crudes may be advantageously blended or mixed to give a mixture having the above-mentioned wide boiling point range or a narrower range within said limiting temperatures, and that from such a blend or mixture, containing proper proportions or polymerizable constituents, it is possible to obtain, by proper treatment, products of great uniformity.

Crude commercial naphthas, due to unsaturated compounds, tar and other objectionable matter, are liable to give a dark colored and unsatisfactory resin if subjected directly to the polymerizing treatment without preliminary treatments. This is particularly the case with fractions containing constituents boiling in the lower part of the above distillation range. With naphthas containing constituents boiling in the upper part of the above-mentioned range, there is somewhat less liability to give a dark product, but such naphthas may contain so much cumaron, indene, etc., that when they are subjected to a polymerization treatment, the resulting solution becomes too heavy and viscous for the acid, soda and wash water to be properly separated.

I have found that the properties and qualities of the resin produced may be materially improved by giving to the crude starting materials a light wash with small amounts of sulfuric acid, insufficient to cause any considerable polymerization; and that the material may be further improved after neutralization by re-distillation. The distillate thus obtained will still contain the greater part of the polymerizable constituents, but will be largely freed from those objectionable substances which are most easily attacked by the acid, and which cause darkening in the color of the resin if not removed before the polymerizing treatment. From the naphthas thus preliminarily treated, it is possible to obtain resin of lighter color than that obtained from the untreated crudes. Moreover, the separation of the acid and soda, at the end of the polymerizing treatment, is also improved by such preliminary treatment.

I have also found it advantageous to use a naphtha or mixture of naphthas containing up to about 30% available resin, and that such naphthas may be so treated as to yield a high grade of resin, and water-white refined naphthas, no further treatment of the naphthas after their distillation from the polymerization products being ordinarily required. Since the resin is the most valuable constituent to be obtained by the process, it is desirable to obtain as high a yield as possible from each run. Up to about 30% of available resin in the material treated, a clean separation of the acid and soda, after the polymerization, is usually obtained, but as the percent of polymerizable material increases above this amount, the separation is apt to become difficult, and with 40% I have found it difficult to remove acid tar and soda.

In order to produce a starting material having the desired content of available resin, I take naphthas of different content of cumaron, etc., and mix these different naphthas (which may be crude or partly refined or refined) for example, naphthas of known high content of cumaron, etc., with naphthas containing less polymerizable material, in such proportions that the mixture will yield about 30% resin. Either before or after such mixing or blanding, these materials are freed from tar-acids and pyridene in the usual manner; and thereafter, and either before or after mixing, they are subjected to a short wash with from about 0.1% to 0.5% of sulfuric acid of a strength between about 60° and 66° Baumé. This acid treatment may, in some cases, be advantageously effected after blending of the different naphthas, so that the composite product is subjected to the treatment, then neutralized and distilled, and the distillate cut and collected in the desired fractions, i. e., the entire composite product may be used, or certain fractions may be removed prior to such utilization. However, where certain crudes are more impure than others, the different crudes may be separately treated before their admixture or blending. The acid treatment is so controlled that there is but slight formation of naphtha soluble resin. The residue from the distillation does not ordinarily exceed about 5% of the material used, and it may be much less; it ordinarily consists of naphthalene and tarry matter, with comparatively little resin.

The preliminary treatment of the naphthas may, in some cases, be omitted, and different single naphthas or combinations of naphthas, or of crude and partly refined or refined materials may be used, either with or without the preliminary treatment, particularly where the amount of polymerizable material is not too greatly in excess of 30%. In general, the preliminary treatment will be of added advantage in giving a lighter product or a product of still further improved qualities.

It is one advantage of the present invention that, by the procedure above described, the ordinary low boiling solvent naphtha, which is not in itself a valuable source of resin, may be refined while at the same time giving the necessary dilution to a richer material which has an available resin content too high to permit it to be handled satisfactorily without such dilution. At the same time, the resin content of the low boiling solvent naphtha is made available. Accordingly, the advantages obtained are cumulative, in that the low boiling solvent naphtha, poor in available resin, and the high boiling naphtha, rich in available resin are so compounded that the polymerizable constituents may be converted with substantial completeness into resin and refined naphthas obtained, as the result of the same operation, from the mixture of low boiling and high boiling fractions. It will be evident that this naphtha can be separated into the fractions desired during its distillation, as hereinafter described.

The present invention makes it possible to obtain resins of different characteristics and of special properties by proper selection of the naphthas utilized in their production. Thus, for example, if it is desired to prepare an especially light-colored and high-melting resin, a comparatively high boiling fraction of lightly washed and re-distilled naphtha may be taken, and this may be diluted with refined or partly refined naphtha, if it contains an unusually large proportion of high boiling polymerizable constituents, and the mixture treated to give a resin of very light color and high melting point.

By a simple examination of the different naphthas available, and by compounding these naphthas to give a blende or mixture of the proper proportions, mixtures may be produced at different times which are of very similar composition and from which resins of great uniformity can be produced, even where the individual naphthas vary widely in their composition and properties.

In general, resins obtained from the higher boiling fractions are harder and have higher melting points, and those from the lower fractions are softer and have lower melting points. Products may thus be obtained of uniformly high melting points, or of uniformly low melting points, as well as intermediate or composite products.

The preliminary acid treatment or wash, and the distillation of the crude material, will not, in many cases, be an essential part of the process; and even without such preliminary treatment and distillation, it is nevertheless possible to produce resin of improved properties according to the present invention; but by such preliminary treatment a lighter colored resin and a product of more uniformly high quality can in most cases be obtained, than without such treatment. Re-distillation alone may, with advantage, be resorted to in many cases and will remove much objectionable tarry material from crudes containing it.

After the preliminary treatment and compounding of the starting materials, in case such materials are to be preliminarily treated, such materials are then subjected to a polymerization treatment. For example, the distillate obtained after the preliminary purification and re-distillation above described or a mixture of distillates is treated with from 1 to 3 volumes per cent. of sulphuric acid of about 62° Baumé at a temperature between about 30° and 35° C. This acid is added gradually and with constant agitation to the oil, and the temperature of the oil is maintained within the desired range both by the rate of addition of the acid, and by means of a cooling coil or other cooling means. It is of advantage to provide means for exerting a strong cooling effect, so that the process may be thereby effected without objectionable overheating, since higher temperatures tend to give a darker resin and form relatively larger amount of heavy oil.

The treatment with acid is continued until a test shows that the necessary polymerization has taken place and that the naphtha by distillation will meet the required specifications. With the dilution of polymerizable constituents above referred to, such constituents are polymerized with substantial completeness, so that the naphtha, after it has been distilled from the polymerization products, is obtained directly in a refined state.

Agitation is now discontinued and the spent acid and acid tar are separated very completely from the polymerization product containing the resin dissolved in the unchanged naphtha. This separation is aided by using an agitator with a steeply sloping cone bottom and by providing such bottom with a heating jacket.

It should be understood that it is not absolutely necessary to adhere strictly to either the temperature range or the strength of acid above mentioned. Nevertheless, the lower the temperature at which polymerization takes place, the lighter colored will be the resin obtained, other conditions being the same. Plant control of the process has been found to be satisfactory at about 30 to 35° C.

The strength of the acid may also be varied somewhat, for example, between 59° and 64° Baumé, usually best about 62°, and successful polymerization effected in various naphthas therewith, depending somewhat on the composition of the naphthas. When the weaker acids are used, a slight amount of concentrated acid may sometimes be added with advantage toward the end of the treatment. The process of the present invention is distinguished from prior processes making use of concentrated sulfuric acid in that little or no concentrated sulfuric acid is employed, and in that the polymerization is effected with weaker acids and at moderate temperatures.

Instead of sulfuric acid, other suitable polymerizing agents can be used, although I consider sulfuric acid of the strength above referred to as most advantageous.

After separation of the acid and tar, the remaining oil, which is still slightly acid, is transferred to a cone-bottomed settling tank in which it is neutralized with soda solution of approximately 1.20 specific gravity. After a rough separation of the soda, the oil is washed with water. This water is advantageously added in the form of a fine spray at the top of the oil and allowed to settle through without agitation, the amount of water usually not exceeding 20% of the volume of the oil. By means of this water wash, the sodium sulfate and other inorganic impurities may be much more rapidly and completely separated from the oil than by settling alone. Slight amounts of organic impurities are also usually removed by this treatment, and the color of the washed oil is correspondingly improved thereby.

If the preliminary steps of the process have been properly carried out, there should be very little emulsification of the oil, although slight amounts of emulsion may be formed. In some cases greater amounts of emulsion will be formed which can be broken up by the further addition of soda.

After the neutralized and washed oil has been settled a number of hours the wash water is drawn off from the bottom of the tank. Any emulsion containing oil is drawn off to a separate tank for further settling, and the remaining clear oil is then transferred to the still. It should contain less than about 0.01% of incombustible matter.

The oil contains the polymerized cumaron, indene, etc. in solution in the excess of unchanged naphtha. The resin is obtained as a still residue after removal of the partly refined and refined naphthas, naphthalene, etc., by distillation.

In order to separate the resin from its solution in the naphtha, the following procedure may, with advantage, be followed. The partly refined and refined solvent naphtha is first removed in any suitable manner, as by distillation under vacuum in a still heated by a steam coil instead of by direct heat. After the usual naphtha fractions have been removed, the resin remains in the still together with naphthalene, and high boiling oils which are formed in varying amounts during the polymerizing treatment and which soften the resin unless removed. The naphthalene has a similar softening effect.

In order to remove the naphthalene and the high boiling oils from the resin, the distillation is continued, by introducing live superheated steam, and maintaining a high vacuum in the still, say 29 inches of mercury. Live steam alone will give very slow removal of the heavy oil, and this removal will be incomplete unless the treatment is continued for a prolonged period of time. Vacuum alone will give incomplete removal of the heavy oil from the products above described, even if the temperature in the still is raised to the decomposition point of the resin. But by combining the use of live superheated steam and vacuum, rapid removal of the difficultly volatilized naphthalene and of the more difficultly volatilized oils, may nevertheless be effected rapidly and at quite moderate temperatures, and by using a very high vacuum and superheating the steam so that the temperature of the material in the still approaches, but remains below, its decomposition point (usually between 240° and 250° C.) a very rapid and economical removal of the oil may be effected, without any appreciable darkening or other objectionable deterioration of the resin.

This distillation with live steam is advantageously effected by introducing the steam into the material at the bottom of the still at a temperature slightly above that at which the still is to be maintained, and by supplying the additional heat required to maintain the temperature in the still and to volatilize the oil by means of a steam coil.

In carrying out the steam distillation, it is of advantage to make use of highly superheated steam and to allow it to flow freely through the heating coil to a second steam main at lower pressure in which it is distributed for further use at other points. In this way the necessary high temperature may be obtained at moderate pressure, and with full and economical use of the superheat temperature of the steam.

Instead of using superheated steam in a steam coil, it is also possible to maintain an effective operating temperature in the still by introducing live steam at a sufficiently high temperature, but I consider the method previously described as the more efficient.

During this distillation with live steam, the distillate of steam and distilled oil, etc., is completely condensed, and collected in vacuum receivers. By providing the still with several receivers, the distillate may be fractionally collected.

It will be evident that various types of apparatus are available for carrying out the various steps of the process of the present invention. In the accompanying drawings, there is illustrated in a somewhat conventional and diagrammatic manner, an arrangement of apparatus well adapted to the practice of the invention, this arrangement being somewhat of the nature of a flow sheet but likewise indicating certain structural features of improvement.

Referring to the flow sheet and apparatus illustrated in the accompanying drawings, the naphthas or crudes are pumped by the pump 1 from the places of storage, through the pipe 2, to the agitator 3. Storage tanks for the soda solution, the weak acid, and the strong acid, are indicated respectively at 5, 6 and 7, and these are arranged to discharge into the agitator 3. A central stirrer 8 is provided, which may be driven at a high speed from any suitable source of power (not shown). The agitator is provided with cooling coils and with a double bottom 9 to which steam may be supplied for heating, or cold water for cooling. From the agitator 9, the respective by-products, including the waste, the soda-carbolate by-product and the acid-pyridine by-product are removed respectively at 11, 12 and 13.

The naphtha, or mixture of naphthas, as hereinbefore described, is subjected to the preliminary "wash" with acid in the agitator 3, after preliminary extraction of the phenol, etc., with the soda solution and the treatment with weak acid to remove tar acids and pyridine. The pyridine extraction is usually followed up by a quick "wash" with about 0.3 volume per cent of 62° Bé. sulfuric acid. The acid is left on but a short time, and is then removed, and the crude oil or naphatha neutralized. The neutralized oil is then redistilled, and, for this purpose, it is pumped by the pump 14 through the pipe 15 to the still 16 which is provided with a steam coil 17 and with a pipe 18 for the direct introduction of live steam. The residue is discharged from the still at 19. The still is provided with a column by-pass 20 by means of which the oil vapor can be passed directly to the condenser 21 and thence to the vacuum receivers 22 which can be maintained under an appropriate vacuum by any suitable means (not shown). The still 16 is provided with a column 24 having a supply pipe 26 and return pipe 25. From this column the distillate passes by the pipe 27 to the partial condenser 28 and then through the pipe 23 to the condenser 21 and to the vacuum receivers 22. From the vacuum receivers 22, the distillate passes by means of the pipe 29 and the branch pipes 30 to the storage tank 31 in which the redistilled naphtha is stored and from which it is supplied by means of the pump 32 to the agitator 33 in which the main polymerization takes place.

When using crude naphtha of a boiling point ranging from 150° C. to 200° C., it is sometimes possible to avoid the redistillation, but it is usually preferable and more advantageous to subject the crudes to the preliminary purification and redistillation, above referred to, since the color of the naphtha is thereby improved, and considerable tarry material and readily removable impurities are separated and the resin subsequently produced is also of improved color and properties. As hereinbefore stated, only a small amount of resin is formed by the preliminary acid treatment, this amount not ordinarily exceeding about 5% and consisting chiefly of the constituents readily acted upon by the relatively small amount of acid employed. This residue, which remains in solution in the naphtha at the separation of the acid and soda solutions, is collected as the residue from the still 16.

If the purified naphtha, resulting from the redistillation, contains about 30% available resin, it can be transferred directly to the polymerization apparatus. If it has a higher content of available resin, it is advantageously diluted with partly refined or refined naphtha. Solvent naphtha of lower boiling point can be employed for the dilution of a too concentrated naphtha of higher boiling point, especially when a low melting resin is desired, but for a higher melting resin the naphthas employed should be of a correspondingly high boiling point and the dilution can be effected, for example, with refined or partly refined naphtha.

After the proper compounding of the charge and the preliminary treatment and redistillation, the polymerization is effected by means of sulfuric acid or other suitable polymerizing agent in the apparatus 33. The acid is supplied from the measuring vessel 34, in appropriate amount, and is introduced through the pipe 35 in the form of a spray. The agitator is provided with an air inlet at the bottom to aid in the agitation and circulation and with the mixing stirrer 36 having a spider bearing 37 of triangular section with the edge up, to prevent collection of the tar thereon. A thermometer well 38 is provided for noting the temperature of the charge; cooling or heating coils 39, four in number, are also provided. By the introduction of steam, the temperature can be preliminarily raised to the desired point, while, if the reaction becomes too vigorous, the heat of reaction can be neutralized by the circulation of cold water to keep the temperature down.

The apparatus is provided with a jacketed conical bottom 40 divided into two compartments, to either or both of which steam or water can be supplied for heating or cooling. From the vessel 33 the waste is drawn off at 41 and the polymerized product is pumped through the pipe 42 to the settling tank 43 where it is neutralized with soda, washed with water, and finally transferred to the still 44. The soda supply for the neutralization is indicated at 45 and the wash water for introducing the water spray is indicated at 46. From the settling tank 43, the waste wash water is drawn off at 47 and any emulsion is drawn off at 48, while the purified and washed polymerization product is transferred through the pipe 49 to the still 44. The settling tank 43 may be provided with suitable means for agitating the oil, such as an air injector or inlet pipe 50 which will introduce the compressed air, and a short section of pipe 51 arranged above the air inlet to assist in the desired agitation, in the manner which will be readily understood. Suitable heating coils 52 are also provided and a steam jacket 53 is also provided at the conical bottom, so that the apparatus may be warmed at this point to facilitate removal of any tarry or other material which may separate out.

In the apparatus 33, the polymerization is effected by agitating the naphthas with the polymerizing agent, for example, from one to three volume per cent of sulfuric acid of a strength between 60 and 62° Bé., as hereinbefore described. A greater quantity of sulfuric acid will not usually be required, nor will concentrated sulfuric acid ordinarily be used at this point, although the amount and strength of the acid can be somewhat varied as previously stated. The temperature throughout the polymerizing treatment is maintained near 35°C. and the treatment is so controlled that the naphthas will be completely "washed" and substantially all of the available resin produced therefrom, so that the distillate from the subsequent treatment will be a water-white material fast to light. At the end of the polymerizing treatment the acid and acid tar are very completely separated from the oil, by settling, and the oil is then transferred to another tank, i. e., the settling tank 43, for neutralization. Substantially complete removal of the acid and acid tar at this point seems to be of considerable importance in the production of light colored resin. The provision of a steam-jacketed conical bottom for both the polymerizing apparatus and the settling apparatus is of importance, as previously pointed out. The residue which settles out in the polymerization apparatus, is a syrupy or gummy mass at ordinary temperatures, but it is liquid when warmed, so that the provision of a conical bottom insures that this material will be removed with substantial completeness from the apparatus.

The polymerization product is treated in the settling tank 43 with usually not over 2% of 1.2 specific gravity soda solution, which is stirred through the oil by means of the air agitation. As soon as neutralization is complete, the agitation is discontinued and the soda solution allowed to settle out. Water is now run through the product by being sprayed over the top thereof and allowed to settle through without agitation. Practically no emulsion is caused by adding the water in this manner and substantially complete separation of inorganic materials can be thus effected, and frequently also improvement of the color of the oil at the same time. When the water has been completely separated from the oil and the latter is free from inorganic contamination, it is transferred to the still 44 for the removal of naphtha therefrom.

If the naphthas employed in the process are heavy naphthas, the polymerization product may have a specific gravity approximately the same as water, or even slightly higher. This gravity may be lowered by dilution with low gravity refined naphtha, until it is sufficiently below that of water to permit the water wash to be effected.

The still 44 in which the naphtha is removed from the polymerization product, is provided with both column and direct vapor by-passes much as is the column still 16, so that if any low boiling naphtha is contained in the product, it may be separated through the column 55, and so that the distillation rate for the remainder of the naphtha can be made more rapid by the use of the direct vapor pipe 56. The residue from the distillation, which is effected by direct heating with the steam coil 57, is very liquid when warm. It is transferred from the still 44 to the still 58 for the subsequent steam distillation. This transfer is of advantage because of the fact that the heavier oil resulting from the steam distillation, if removed in the same still as the naphtha, will contaminate the naphtha and throw it off specification, and because the use of the same condenser and receiver for both the naphtha and the heavy oil would cause contamination of the naphtha from the succeeding run by the residual heavy oil from the former run. By completing the removal of the refined naphthas in one still and by effecting all steam distillation of heavier oils in another still, it is possible to collect the maximum amount of refined naphtha; and it is thus possible to produce directly from the polymerization product both a low boiling naphtha (provided this is present in the charge), and a purified high boiling naphtha, as well as a heavy boiling oil which is substantially free from naphtha fractions.

The entire distillation can, however, be carried out in the same still by the provision of a return pipe 70, so that the entire condenser can be washed out by the first naphtha fractions of the next run, heavier material from the previous run being thus returned with the naphtha until the condenser is cleaned out, so that the naphtha can then be distilled and obtained free from contamination.

In the distillation of the heavy oil in the still 58, a high vacuum is maintained of about twenty-nine inches or more and the temperature of the still is preferably as high as possible, without injury to the resulting product.

The heating means for the still 58 illustrated on the drawings includes the steam coil 57 and the live steam pipe 69, both of which are supplied from a high pressure superheated steam main 65. The high pressure steam from this main passes through the pipe 66 to the coil 57, and thence through the steam separator and the branch pipe 67 to the steam main 68 containing steam at a lower pressure. This arrangement provides for the use of steam of high super-heat so that the peak of the super-heat is made available in the process, as hereinbefore described, and so that the steam is still made available at a lower temperature for other purposes.

Distillation is discontinued when a sample taken from the still and tested shows the required consistency. Products melting from 90 to 100° C. and even as high as 110 to 120° C., or higher, are readily obtainable from properly selected naphthas of high boiling point and even from naphthas containing fractions of lower boiling point when the charge is properly compounded. In general, however, the use of solvent naphtha of lower boiling point will give a softer resin.

The heavy oils from the still 58, as well as the naphthas from the still 44, are collected in the receiving vessels 59, 60, 61 and in the storage tanks 62, 63, 64, while the resin in a molten state is drawn off from the bottom of the still 58 to a suitable place of storage or of use. The advantages of the invention will be more readily apparent from the foregoing description and from the apparatus illustrated, and it will be readily seen that the process provides for the preliminary purification and compounding of the charge as well as for the polymerization treatment and the subsequent neutralization, washing and distillation, in such a manner that there is produced as the result of the same process both a high grade resin of light color and improved properties and refined and purified naphthas substantially free from resin constituents, while the high boiling oil remaining in the resin after the separation of naphthas is likewise separated and recovered in a form available for use. Partial separation of the oil from the steam may be effected, if desired, by partially condensing and collecting the oil in a hot receiver, and by then passing the steam vapor through the remaining condenser and collecting it in a cold receiver.

The steam distillation is continued until the resin in the still is found, upon test, to have the desired melting point; after which the heating is continued for a short time in the absence of live steam to drive off traces of moisture. The resin is then drawn off in a hot molten state to suitable containers or to its place of further use or of shipment.

The resin produced in the manner described is, after cooling, usually a hard and more or less brittle product which may be obtained substantially freed from high boiling oils and softening volatile constituents.

The melting point of the resin may be varied by leaving varying amounts of the high boiling oil therein. Thus, in the steam distillation step of the process, the distillation with superheated steam and vacuum may be discontinued to give a lower melting point product, still containing more or less of the heavy oil, or such distillation may be continued to effect substantially complete removal of such oil and the production of a higher melting point product,—for example, a resin having a melting point of 90° or more (depending on the naphthas employed). A resin may thus be obtained which is of light color and has not been darkened, which is also free or substantially free from inorganic impurities, and which will not absorb water.

Where a lower melting point product is desired, this may be produced, as above stated, by discontinuing the steam distillation when a product of the desired melting point has been reached. It may also be produced from the harder products of higher melting point by adding thereto the necessary amount of the high boiling oil.

The distillation of the unchanged naphthas from the product after polymerization also gives refined naphthas which, when the proper preliminary purification of the starting materials has been effected, will meet such specifications for boiling point, color, etc., as are usually required.

It will accordingly be seen that the process of the present invention results in the production of products of high value, both as to the resin, and as to the refined naphthas; and that these products are nevertheless obtained from starting materials which vary widely in character and in boiling point. It will also be seen that the products are obtained, with greater uniformity, from starting materials of widely varying characteristics, by properly compounding or blending such starting materials to give a composite product of average available resin content, and by subjecting such composite starting material to subsequent treatment for the production of the resin and of the refined naphtha.

It will further be seen, from the foregoing description, that certain of the various steps of the process can be used with advantage, even where the various other steps are not used as a part of the same process or treatment. Thus, for example, the preliminary treatment may, in some cases, be unnecessary, because of the character of the starting materials available, or because of the character of the product desired, and particularly where a product of the highest purity and value is not required. So also, the preliminary compounding or mixing of different starting materials, to give a composite product of the proper average available resin content, is of advantage irrespective of whether the subsequent treatment is the particular treatment hereinbefore described; but these various steps are nevertheless of particular advantage when conjointly used, or when used as successive steps of the same treatment; and, when so used, they separately and advantageously contribute to the production of products of the desired uniformity.

The term "resin," as used in the present specification and in the accompanying claims, is understood to mean one or more of the polymerization products of cumaron, indene, and other polymerizable bodies found in those naphthas and heavy benzols obtained from the distillation of coal tar and from benzol and toluol manufacture which boil within the approximate range from 135° to 230° C.; or in such fractions of such naphthas and heavy benzols as may be used and subjected to the polymerization treatment.

The term "solvent naphtha" is intended to apply to such naphthas or heavy benzols as are referred to in the preceding paragraph.

The term "available resin" will be understood to mean the amount of polymerizable cumaron, indene, etc., which can be separated or obtained as resin from any given crude material or mixture of crude materials by the treatments hereinbefore described.

I claim:

1. The process of making a resin from naphthas containing resin-forming constituents of the cumarone-indene series, which comprises mixing different solvent naphthas to give a composite mixture having a boiling point range within the approximate limits of 135° and 230° C., and subjecting the same to a polymerization treatment.

2. The process of making a resin from naphthas containing resin forming constituents of the cumarone-indene series, which comprises mixing solvent naphthas of different available resin content to give a mixture of intermediate available resin content, and subjecting the resultant mixture to a polymerization treatment.

3. The process of making a resin from naphthas containing resin forming constituents of the cumarone-indene series, which comprises mixing different solvent naphthas of different available resin content in such proportions that the mixture will contain about 30% available resin, and subjecting the resulting mixture to a polymerization treatment.

4. The process of making a resin of substantially uniform properties from solvent naphthas of different composition and available resin content, which comprises mixing said solvent naphthas to give mixtures of substantially the same composition and available resin content, and subjecting the resultant mixtures to similar polymerization treatments.

5. The process of making a resin from naphthas containing resin forming constituents of the cumarone-indene series, which comprises mixing different solvent naphthas to give a mixture having a boiling point range within the approximate limits of 135° to 230° C., and containing about 30% available resin and subjecting the resultant mixture to a polymerization treatment.

6. The process of making a resin from naphthas containing resin-forming constituents of the cumarone-indene series, which comprises subjecting solvent naphthas of different degrees of purity as well as different content of available resin to separate treatments for removing unsaturated and undesirable bodies from each, mixing and subjecting the mixture to a polymerizing treatment.

7. The process of making a resin from naphthas containing resin-forming constituents of the cumarone-indene series, which comprises redistilling a mixture of solvent naphthas, whereby undesirable components may be removed therefrom, and subjecting the redistilled products containing about 30% available resin to a polymerizing treatment.

8. The process of making a resin from naphthas containing resin-forming constituents of the cumarone-indene series, which comprises redistilling a plurality of solvent naphthas of different available resin content, mixing these, and subjecting the mixture to a polymerizing treatment.

9. The process of making a resin from naphthas containing resin-forming constituents of the cumarone-indene series, which comprises subjecting a solvent naphtha to a polymerizing treatment with about 62° Bé. sulfuric acid and neutralizing and distilling the resulting product to separate removable impurities from the resin.

10. The process of making a resin from naphthas containing resin-forming constituents of the cumarone-indene series, which comprises subjecting solvent naphthas containing about 30% available resin to a polymerizing treatment with sulfuric acid of less than 66° Bé.

11. The process of making a resin from naphthas containing resin-forming constituents of the cumarone-indene series, which comprises subjecting solvent naphthas boiling between about 135° and 230° C. to treatment with sulfuric acid of less than 66° Bé., and at a temperature under 40° C., and separating the resin so formed.

12. The process of making a resin from naphthas containing resin-forming constituents of the cumarone-indene series, which comprises subjecting solvent naphthas boiling between about 135° and 230° C., to treatment with sulfuric acid of a concentration less than about 66° Bé., and at a temperature of about 35° C., and separating the resin so formed.

13. The process of making a resin from naphthas containing resin-forming constituents of the cumarone-indene series, which comprises subjecting solvent naphtha to treatment with sulfuric acid of about 62° Bé. at a moderate temperature, and further subjecting the same to treatment with concentrated acid to complete the polymerization, and separating the resin so formed.

14. The process of making a resin from naphthas containing resin-forming constituents of the cumarone-indene series, which comprises subjecting solvent naphtha to a polymerizing treatment with less than three volume per cent of sulfuric acid of 59° to 64° Bé. and separating the resin so formed.

15. The process of making a resin from naphthas containing resin-forming constituents of the cumarone-indene series, which comprises mixing different naphthas to give a mixture containing up to about 30% available resin, subjecting the mixture to a polymerizing treatment with from about 1 to 3 volume per cent of sulfuric acid of about 62° Bé., and maintaining the temperature at about 30° C. during the polymerizing treatment.

16. The process of making a resin from naphthas containing resin-forming constituents of the cumarone-indene series, which comprises mixing solvent naphthas of different available resin content to give a composite mixture having a boiling point range between about 125° C. and 230° C., and containing about 30% available resin, subjecting such mixture to a polymerizing treatment with small amounts of sulfuric acid, and maintaining a low temperature during the polymerization.

17. The process of making a resin from naphthas containing resin-forming constituents of the cumarone-indene series, which comprises treating solvent naphtha with a polymerizing agent and then diluting with a partly refined, or refined naphtha to aid complete separation of the acid, washing with a soda solution and subsequent separation of the soda solution.

18. The process of making a resin from naphthas containing resin-forming constituents of the cumarone-indene series, which comprises subjecting solvent naphthas to a preliminary purification with sulfuric acid without any considerable polymerization of the available resin content, separating impurities subjecting the treated naphthas, having a content of about 30% available resin, to a polymerizing treatment with small amounts of sulfuric acid, and maintaining the temperature around 35° C. during the polymerization.

19. The process of making a resin from naphthas containing resin-forming constituents of the cumarone-indene series, which comprises the mixing of a solvent naphtha of boiling range of about 135° to 230° C., and which contains a large amount of specific polymerizable compounds with a partly refined or refined naphtha, to give a composite product containing about 30% of available resin, and subjecting the mixture to a polymerizing treatment.

20. The process of making a resin from naphthas containing resin-forming constituents of the cumarone-indene series, which comprises subjecting a solvent naphtha to an acid polymerizing treatment, separating the acid and acid tar formed, neutralizing the remaining acid with a soda solution, and washing the neutralized product with water by introducing the water in the form of a spray and allowing it to settle through the neutralized material without added agitation.

21. The process of purifying solutions of resinous polymerization products of the cumarone-indene series, in solvent naphtha, after the polymerizing treatment and after neutralization, which comprises introducing a water spray and permitting the water to settle through the material without added agitation thereof.

22. The process of making a resin from naphthas containing resin-forming constituents of the cumarone-indene series, which comprises subjecting a mixture of solvent naphthas of about 30% available resin content to a polymerizing treatment with sulfuric acid, thereafter subjecting the material to a neutralizing treatment with soda, and washing the neutralized material with water to remove soda and sodium sulfate and other objectionable bodies before subjecting it to distillation, or other treatment, for the removal of the naphtha and other volatile constituents.

23. The process of making a resin from naphthas containing resin-forming constituents of the cumarone-indene series, which comprises diluting solvent naphtha of high available resin content with partly refined or refined naphthas to give a product of lower available resin content, subjecting the resulting mixture to a polymerizing treatment, purifying the polymerization product and recovering the resin therefrom by distillation of volatile constituents.

24. The process of making a resin from naphthas containing resin forming constituents of the cumarone-indene series, which comprises mixing naphthas having different amounts of resin forming constituents therein to produce a mixture containing about 30% available resin content, subjecting said mixture to a polymerization treatment so that substantially complete polymerization will be effected, and distilling off the naphthas to obtain the resin.

25. The process of purifying solutions of resinous polymerization products of the cumarone-indene series, in naphtha, which comprises subjecting the same at a reduced pressure, to distillation with live superheated steam alone, the steam being superheated enough to maintain the temperature in the still.

26. The process of purifying solutions of resinous polymerization products of the cumarone-indene series, in naphtha, which comprises subjecting the same to distillation with live superheated steam, while at the same time maintaining the temperature of the still by indirect heating with superheated steam and maintaining the still under a reduced pressure.

27. The process of making a resin from naphthas containing resin-forming constituents of the cumarone-indene series, which comprises subjecting solvent naphthas to a polymerizing treatment with sulfuric acid and cooling the reaction mixture to prevent any considerable rise in temperature during the addition of the acid or the polymerizing treatment.

28. The process of making a resin from naphthas containing resin-forming constituents of the cumarone-indene series, which comprises subjecting solvent naphthas containing about 30% of available resin to a polymerizing treatment with sulfuric acid by gradually adding the acid and cooling the mixture to prevent any considerable rise in temperature during the polymerization.

29. The process of making a resin from naphthas containing resin forming constituents of the cumarone-indene series, which comprises subjecting heavy solvent naphtha to a polymerizing treatment with sulfuric acid, neutralizing, diluting with low gravity refined naphtha, and washing with water.

30. The process of making a resin from naphthas containing resin forming constituents of the cumarone-indene series, which comprises subjecting naphtha, that will give a polymerization product having a high specific gravity, to a polymerizing treatment with sulfuric acid, diluting said polymerization product with refined naphtha of specific gravity less than unity and washing with water.

31. The process of making a resin from naphthas containing resin forming constituents of the cumarone-indene series, which comprises subjecting naphtha, that will give a polymerization product having a high specific gravity, to a polymerizing treatment with sulfuric acid, neutralizing with a soda solution, diluting with refined naphtha of specific gravity less than unity and washing with water.

In testimony whereof I affix my signature.

CLARK M. DENNIS.